United States Patent
Siebers et al.

(10) Patent No.: US 9,296,645 B2
(45) Date of Patent: Mar. 29, 2016

(54) TRANSPARENT LOW-COLOR LITHIUM ALUMINUM SILICATE GLASS CERAMIC AND THE USE THEREOF

(71) Applicant: Schott AG, Mainz (DE)

(72) Inventors: Friedrich Siebers, Nierstein (DE); Evelin Weiss, Mainz (DE); Klaus Schoenberger, Mainz (DE); Ulrich Schiffner, Mainz (DE); Falk Gabel, Schlangenbad (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/462,710

(22) Filed: Aug. 19, 2014

(65) Prior Publication Data

US 2014/0357468 A1 Dec. 4, 2014

Related U.S. Application Data

(63) Continuation of application No. PCT/EP2013/053485, filed on Feb. 21, 2013.

(51) Int. Cl.
| | |
|---|---|
| C03C 10/12 | (2006.01) |
| C03C 10/14 | (2006.01) |
| C03C 10/00 | (2006.01) |
| C03C 3/095 | (2006.01) |

(52) U.S. Cl.
CPC ............ *C03C 10/0027* (2013.01); *C03C 3/095* (2013.01); *C03C 10/0009* (2013.01)

(58) Field of Classification Search
CPC .................. C03C 10/0009; C03C 10/0027
See application file for complete search history.

(56) References Cited

U.S. PATENT DOCUMENTS

| | | | | |
|---|---|---|---|---|
| 6,248,678 | B1 | 6/2001 | Pinckney | |
| 7,981,823 | B2 * | 7/2011 | Siebers et al. | 501/7 |
| 8,053,381 | B2 * | 11/2011 | Siebers et al. | 501/4 |
| 8,685,873 | B2 * | 4/2014 | Siebers et al. | 501/68 |
| 2007/0232476 | A1 * | 10/2007 | Siebers et al. | 501/4 |
| 2007/0259767 | A1 * | 11/2007 | Siebers et al. | 501/59 |
| 2009/0018007 | A1 * | 1/2009 | Siebers et al. | 501/63 |

(Continued)

FOREIGN PATENT DOCUMENTS

| | | |
|---|---|---|
| CN | 1254688 A | 5/2000 |
| CN | 1607191 A | 4/2005 |

(Continued)

OTHER PUBLICATIONS

International Search Report dated Jul. 16, 2013 corresponding to PCT/EP2013/053485, with English translation, 5 pages.

(Continued)

*Primary Examiner* — Karl Group
(74) *Attorney, Agent, or Firm* — Ohlandt, Greeley, Ruggiero & Perle, LLP

(57) ABSTRACT

A transparent low-colour lithium aluminium silicate (LAS) glass ceramic and the use thereof are provided. The ceramic has an environmentally friendly composition with high-quartz mixed crystals as the main crystal phase. The glass ceramic contains the following components (in wt % on the basis of oxide): $TiO_2$ 1.6-<2.5; $Nd_2O_3$ 0.005-0.15; MgO 0.2-1.0; ZnO 1-2.5; CaO+SrO 0-1.5; BaO 0-1.5 with the condition B1: MgO+ZnO>CaO+SrO +BaO. In some embodiments, the glass ceramic has a hue c* of less than 5.5, a light transmission Y greater than 81% and has no visually disruptive diffusion.

43 Claims, 1 Drawing Sheet

Transmission curve of the glass ceramic of Example 21

Wavelength (nm)

(56) References Cited

U.S. PATENT DOCUMENTS

| | | | | |
|---|---|---|---|---|
| 2009/0286667 A1* | 11/2009 | Siebers et al. | | 501/59 |
| 2010/0130342 A1* | 5/2010 | Siebers et al. | | 501/7 |
| 2012/0302422 A1* | 11/2012 | Siebers et al. | | 501/32 |

FOREIGN PATENT DOCUMENTS

| | | |
|---|---|---|
| DE | 102008050263 A1 | 4/2010 |
| DE | 102010027461 A1 | 1/2012 |
| DE | 102010032113 A1 | 1/2012 |
| EP | 1516863 A1 | 3/2005 |
| EP | 1837312 A1 | 9/2007 |
| EP | 1837314 A1 | 9/2007 |
| JP | 11228180 A | 8/1999 |
| JP | 11228181 A | 8/1999 |
| WO | 2008065166 A1 | 6/2008 |
| WO | 2008065167 A1 | 6/2008 |

OTHER PUBLICATIONS

"Low Thermal Expansion Glass Ceramics" Second Edition, Editors Hans Bach, Dieter Krause, Springer Publishers, Berlin Heidelberg 2005.

Muller, "Volumen und Thermische Ausdehnung von Aluminosilikat-Mischkristallen mit h-Quarz-Struktur [Volume and Thermal Expansion of Aluminosilicate Mixed Crystals with h-Quartz Structure", Fortschr. Miner. 63 1985, with English translation, pp. 7-20.

Written Opinion of the International Searching Authority dated Jul. 16, 2013 corresponding to PCT/EP2013/053485, with English translation, 12 pages.

International Preliminary Report on Patentability dated Aug. 26, 2014 corresponding to PCT/EP2013/053485, with English translation, 15 pages.

* cited by examiner

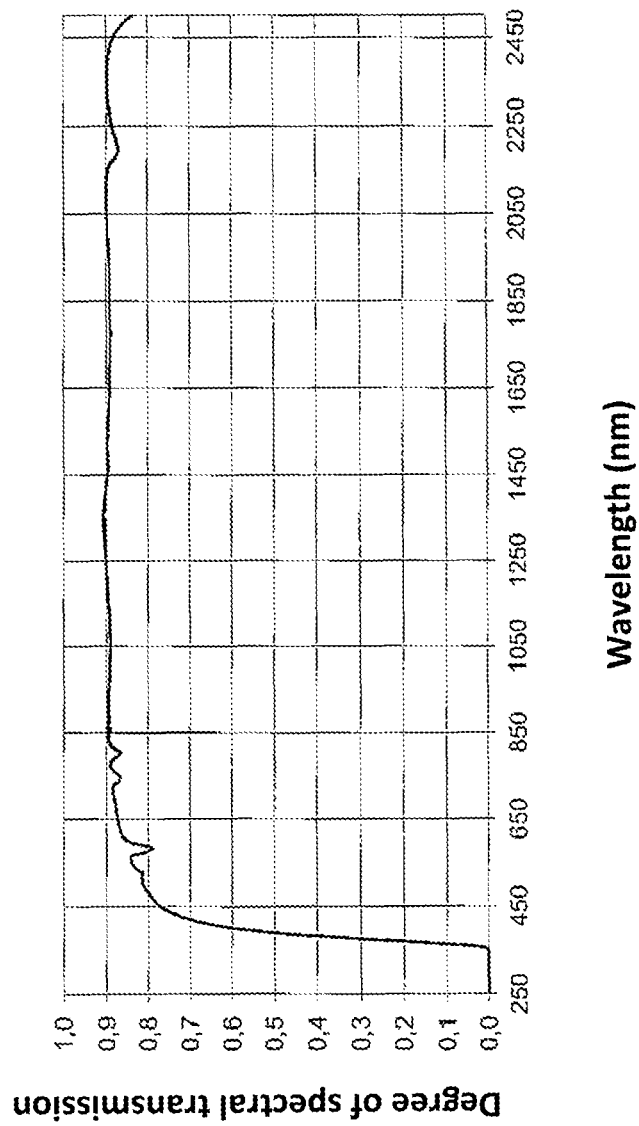

TRANSPARENT LOW-COLOR LITHIUM ALUMINUM SILICATE GLASS CERAMIC AND THE USE THEREOF

CROSS REFERENCE TO RELATED APPLICATIONS

This application is a continuation International Application Serial No. PCT/EP2013/053485 filed Feb. 21, 2013, which claims benefit under 35 U.S.C. §119(a) of German Patent Application No. 10 2012 202 697.5, filed Feb. 22, 2012, the entire contents of both of which are incorporated herein by reference.

BACKGROUND

1. Field of the Disclosure

The invention relates to a transparent, particularly low-color, lithium aluminum silicate glass ceramic and to the use of such an LAS glass ceramic.

2. Description of Related Art

It is known that glasses of the $Li_2O$—$Al_2O_3$—$SiO_2$ system can transform into glass ceramics with high-quartz mixed crystals and/or keatite mixed crystals as main crystal phases.

A key property of these glass ceramics with high-quartz mixed crystals as the main crystal phase is the ability to produce materials that provide an extremely low heat expansion coefficient in a pre-specified temperature range. Usually the thermal expansion behavior is established so that the materials provide very low expansion, for the most part $0\pm0.3\cdot10^{-6}$/K, in the region of their application temperatures. Thus, e.g., with application as substrate materials, wafer stages, or mirror supports for telescopes, thermal expansion in the region of room temperature is minimized.

For applications as fire-resistant glass, transparent fireplace windows or viewing panels or cooktops with colored underside coating, the zero thermal expansion in a temperature range between room temperature and approximately 700° C. is adjusted to the lowest possible values. For cooktops having gas and induction heating, maximum application temperatures of approximately 500° C. are sufficient. Current specifications for thermal expansion are approximately $0\pm0.15\cdot10^{-6}$/K for cooktops and approximately $0\pm0.3\cdot10^{-6}$/K for fireplace panels (for this, see Tables 3.3 and 3.4 in the book: "Low Thermal Expansion Glass Ceramics", Second Edition, Editors Hans Bach, Dieter Krause, Springer Publishers, Berlin Heidelberg 2005, ISBN 3-540-24111-6).

Based on the low thermal expansion at their application temperatures, these glass ceramics possess an excellent resistance to differences in temperature and fluctuations in temperature, as well as dimensional constancy.

With application as cooktops, the transparent, low-color glass-ceramic panels for the most part are provided with an opaque color coating on the underside in order to prevent a view onto the technical components and to furnish a color effect. Recesses in the coating on the underside enable the introduction of colored and white displays, for the most part light diodes.

Transparent glass ceramics are distinguished from colored transparent glass ceramics, in which $V_2O_5$ is particularly added to the volume for coloring, in order to reduce light transmission to values below 5% and to prevent the view onto the technical components underneath the cooktop.

The large-scale production of transparent glass ceramics is conducted in several steps. First, the crystallizable initial glass made up of a mixture of shards and powder-form batch raw materials is melted and refined at temperatures usually between 1550 and 1700° C. Typically, arsenic oxide and sometimes antimony oxide are used as refining agents in the melt. For transparent glass ceramics with their comparatively high melting temperatures, arsenic oxide is the technically and economically most favorable refining agent with respect to good bubble qualities at conventional refining temperatures below 1700° C. In addition, arsenic oxide is advantageous for the transparency (high light transmission and little color) of the glass ceramics. For these compelling technical reasons, the transparent glass ceramics NEOCERAM® N-0 of the company Nippon Electric Glass, KERALITE® of the company Eurokera and ROBAX® of the company Schott AG, which are currently available on the market, are refined with arsenic oxide. Although these substances are solidly bound in the glass skeleton, they are a disadvantage from the aspects of safety and environmental protection. Thus, special precautionary measures must be taken in the recovery and processing of raw materials and because of their vaporization out of the melt. Because of this, numerous developmental attempts have been made to replace these materials, but these efforts could not be implemented previously for technical and economic reasons.

After melting and refining, the glass usually undergoes a hot forming by rolling or more recently also by floating, in order to produce plates or panels.

In a subsequent temperature process, the initial glass is converted into the glass-ceramic article by controlled crystallization. This ceramicizing takes place in a two-step temperature process, in which first, nuclei are produced by nucleation at a temperature between 680 and 810° C., usually from $ZrO_2/TiO_2$ mixed crystals. $SnO_2$ can also participate in the nucleation. With subsequent increase in temperature, the high-quartz mixed crystals grow on these nuclei.

The structure of the glass ceramics is homogenized and the optical, physical, and chemical properties are established for the maximum production temperature. If desired, the high-quartz mixed crystals can subsequently still be converted into keatite mixed crystals. The transformation into keatite mixed crystals is produced with an increase in temperature in a range of approximately 970° C. to 1250° C. With the transformation, the thermal expansion coefficient of the glass ceramics increases and by further crystal growth, light scattering occurs, combined with a translucent to opaque appearance.

Absorption and scattering are the optical phenomena that must be mastered for economical production.

The brownish hue of transparent lithium aluminum silicate glass ceramics has different causes that are primarily based on absorption mechanisms and partially on scattering.

The coloring element Fe is contained as an impurity in the batch raw materials for the melts. The latter colors ionically as $Fe^{3+}$ as well as via Fe/Ti color complexes. Due to the high cost of low-iron raw materials, it is not economical to reduce the $Fe_2O_3$ content to values of 100 ppm and thereunder.

Electronic transitions of color complexes, which absorb in the short-wave region of visible light and in which participates the component $TiO_2$ that is effective for the nucleation, constitute the strongest absorption mechanism of transparent glass ceramics. The color complex arises due to the formation of adjacent Fe and Ti ions, between which occur electronic charge-transfer transitions.

With the use of $SnO_2$ as an environmentally-friendly refining agent, the arising Sn/Ti complexes cause an additional absorption. The Fe/Ti color complexes lead to a red-brown coloring; the Sn/Ti color complexes lead to a yellow-brown coloring. The Sn/Ti color complexes color more intensely and this circumstance has previously made it difficult to substitute the refining agent arsenic oxide by $SnO_2$ in the case of transparent glass ceramics.

The formation of the named color complexes largely occurs during ceramicizing.

In order to reduce the concentration of color complexes, it is advantageous to shorten the times for nucleation and crystallization. Opposing this is the fact that the shortening of the nucleation time leads to enhanced light scattering and the shortening of the crystallization time leads to irregularities in the article.

The effective nucleating agent $TiO_2$ can only be replaced with disadvantages in the melt and in forming by the alternative nucleating agents $ZrO_2$ and $SnO_2$. This means that the desired low melting temperatures and short ceramicizing times lead to an enhanced coloring based on the color complexes, even without the visually disruptive scattering due to the $TiO_2$ content required therefor.

Numerous developmental attempts have been made for producing environmentally-friendly, transparent glass ceramics without the use of the refining agents arsenic oxide and antimony oxide. These could not be implemented previously for technical and economic reasons. Transparency, i.e., high light transmission and little coloring without visually disruptive scattering could not be reconciled with favorable manufacturing conditions.

One approach involves compositions without the nucleating agent $TiO_2$, which lead to disadvantages during production.

Thus, WO 2008 065167 A1 describes the production of environmentally-friendly, transparent glass ceramics without disruptive coloring. These glass ceramics avoid the addition of $TiO_2$ as a nucleating agent and are based on a mixed nucleation by $ZrO_2$ and $SnO_2$. The $ZrO_2$ contents necessary for sufficiently rapid nucleation are 2-5 wt. %, and the $SnO_2$ contents are >0.4-3 wt. %. With these high contents of $ZrO_2$ and $SnO_2$ the melting of the batch is slowed down, the melting and forming temperatures are increased, and the devitrification resistance of the glass is adversely affected. During the forming, which occurs at viscosities around the processing temperature $V_A$ von $10^4$ dPas, disruptive crystal phases containing Sn and Zr crystallize out. This leads to an unacceptable reduction in the strength of the glasses and the glass ceramics produced therefrom.

Another approach involves transparent glass ceramics without arsenic oxide and antimony oxide as refining agents with small contents of $TiO_2$, but which also require higher contents of $SnO_2$ and $ZrO_2$ as nucleating agents. In WO 2008 065166A1, $TiO_2$ is limited to 0.3-<1.6 wt. %. Contents of $SnO_2$ from 0.25-1.2 wt. % and $ZrO_2$ from >2-3.8 wt. % are required. These high contents are accompanied by the described disadvantages in the melt and in forming as well as a deficient devitrification resistance.

The documents JP 11-228180 A2 and JP 11-228181 A2 describe environmentally-friendly compositions of transparent glass ceramics. In order to obtain sufficient bubble qualities without using arsenic oxide as a refining agent, the glass ceramics contain a combination of the refining agents $SnO_2$ and Cl at 0.1-2 wt. %. The physical decoloring agent $Nd_2O_3$ is not used, so that the Sn/Ti color complex is fully brought to bear. In particular, the high $SnO_2$ contents shown in the embodiment examples are very harmful for the devitrification resistance. The documents do not provide any indications of how the $SnO_2$ content must be limited so as to assure sufficient devitrification resistance. In addition, these documents do not provide any indication for optimizing the manufacturing properties by the selection of the components CaO and SrO and the adjustment of crystal composition and composition of the residual glassy phase by the ratios of the divalent components MgO, ZnO as well as CaO, SrO and BaO.

The physical decoloring of transparent glass ceramics by additions of $Nd_2O_3$ and CoO, which absorb in the longer-wave red spectral region is disclosed in EP 1837312 B1. The document preferably describes compositions refined with arsenic oxide. In addition to the use of arsenic oxide, the use of 0.1-0.4 wt. % $SnO_2$ in combination with high-temperature refining over 1700° C. is also disclosed as an environmentally-friendly refining agent. This document does not provide any indications as to how the composition must be created in order to obtain particularly favorable manufacturing conditions, i.e., low melting and low forming temperatures.

There is thus a need for decreasing the melting and forming temperatures without disadvantages for the rate of ceramicizing, since these are of crucial importance for energy efficiency and economical production. In addition, this step does not provide any indications for optimizing the devitrification resistance and transparency by the selection of the components CaO, SrO and BaO. The establishing of crystal composition and composition of the residual glassy phase for improving the transparency with short ceramicizing times by means of the ratios of the divalent components MgO, ZnO as well as CaO, SrO and BaO is not described.

SUMMARY

It is an object of the invention to find a transparent, low-color lithium aluminum silicate glass ceramic with an environmentally-friendly composition, favorable manufacturing properties and economical production, in particular with respect to the selection of batch raw materials, short ceramicizing times, as well as melting and forming temperatures.

It is also an object of the invention to find a use for the LAS glass ceramics.

In this case, the glass ceramics should satisfy the requirements of, e.g., chemical stability, mechanical strength, transmission, temperature resistance and long-term stability with respect to changes in their properties (such as, e.g., thermal expansion, transmission, buildup of stresses). With respect to temperature resistance, low shrinkage (compaction) of the glass ceramics at high temperatures is also a relevant property. Since the glass-ceramic articles are for the most part heated throughout non-uniformly during use, stresses build up over long times due to compaction.

These objects are achieved by a transparent lithium aluminum silicate glass ceramic and by the use thereof as described herein.

DESCRIPTION OF THE DRAWINGS

The sole FIGURE is a transmission curve of an exemplary embodiment of a glass ceramic according to the present disclosure as shown in Example 21.

DETAILED DESCRIPTION

For an environmentally-friendly composition, it is understood that the glass ceramics are technically free of arsenic oxide and antimony oxide as the usual refining agents, except for unavoidable raw-material impurities. As an impurity, these components are usually present in contents of less than 500 ppm, usually less than 200 ppm. In exceptional cases, the $As_2O_3$ content can be a maximum of 1000 ppm, if shards of transparent glass ceramics containing arsenic oxide as a refining agent are added to the melt. Since an effective contribution to environmental protection is provided with this recycling due to savings in energy and raw materials, in this case, a higher $As_2O_3$ content up to less than 1000 ppm is permissible. This is the upper limit to be maintained with respect to raw-material impurities in the scope of the invention.

The economically favorable manufacturing properties for an economical production include inexpensive batch raw materials, low melting and forming temperatures, devitrification resistance, and short ceramicizing times. With short ceramicizing times, a high light transmission without visually disruptive light scattering (turbidity or haze) or coloring is achieved.

In addition, the glass ceramics should fulfill specific properties: Transparency, which is adjusted after the ceramicizing, is an essential property for the quality of the glass ceramics. The light transmission, which is measured in the CIE color system as light transmission Y (brightness), should therefore be as high as possible.

The coloring of the transparent, low-color lithium aluminum silicate glass ceramics should be slight, so that the color is not distorted when viewing through the glass onto objects or the underside coating, as well as the colors of indicators.

The transparent glass ceramics should provide no visually disruptive light scattering, so that the through-view onto objects and lighting indicators is not distorted. The indicators of displays under the glass-ceramic panel should be clear, the contours sharp, and visible without turbidity.

Achieving the overall requirements for light transmission, coloring, and turbidity is assured with short ceramicizing times of less than 200 min. Particularly preferably, short ceramicizing times of less than 90 min are conducted. But in this case, there are conflicting objectives.

For short ceramicizing times, high rates of nucleation are essential, for which the component $TiO_2$ is an active participant. Higher $TiO_2$ contents, however, are critical due to the formation of Fe/Ti color complexes and/or Sn/Ti color complexes. Therefore, the $TiO_2$ amount should be <2.5 wt. %. It has been shown that with short ceramicizing times, in contrast, in the case of small $TiO_2$ contents of less than 1.6 wt. %, an enhanced turbidity arises, since, as a consequence, reduced nucleation density also reduces the number of crystals and thus increases the size thereof. Higher crystallite sizes greatly increase the scattering. A particularly preferred range for the $TiO_2$ content is therefore 1.8-<2.5 wt. %.

In order to solve these conflicts in objectives, it was surprisingly found that the microstructure of the glass ceramics can be established in a targeted manner. The approach according to the invention consists of establishing the microstructure of the glass ceramics, i.e., crystallite phase and residual glassy phase, in a targeted manner. In order to reduce the scattering, even with rapid ceramicizing, it is desirable to minimize the difference in the refractive indices of the high-quartz mixed-crystal phase and the residual glassy phase.

It was found in a comprehensive test series that the divalent components MgO, ZnO, CaO, SrO and BaO play a key role here. In the prior art, CaO, SrO and BaO are listed as optional components. It has been shown, however, that it is necessary to maintain narrow limits and minimum contents for the named divalent components.

A part of the MgO is incorporated in the high-quartz mixed crystals. A minimum MgO content of 0.2 wt. % is required, since this component is particularly effective for decreasing the viscosity of the glass melt at high temperatures, thus at the $10^2$ temperature. This property is important for economical production. The minimum content of MgO is preferably 0.3 wt. %.

The MgO content is limited to a maximum of 1.0 wt. %, preferably up to 0.9 wt. %. Higher MgO contents are a disadvantage, since they inadmissibly increase the expansion coefficient of the glass ceramics. Higher contents in the aimed-at short ceramicizing times also lead to an enhanced coloring or hue c*.

ZnO is also incorporated in the high-quartz mixed crystals. This component has also proven to be particularly favorable for the transparency of the glass ceramics. In particular, the scattering is reduced with short ceramicizing times. The ZnO content shall amount to at least 1 wt. %. The ZnO content is limited to values of 2.5 wt. % at most, due to the tendency to vaporize in the melt and in forming. Preferably, it has a content greater than 1.5 wt. % up to 2.2 wt. %.

The alkaline earths CaO, SrO and BaO improve the meltability and the devitrification resistance during the forming of the glass. The contents must be limited, however, since these components are not incorporated in the crystal phase, but remain in the residual glassy phase of the glass ceramics. Contents that are too high adversely affect the crystallization behavior during the transformation of the crystallizable initial glass into the glass ceramics. In addition, higher contents act unfavorably on the time/temperature resistance of the glass ceramics.

The sum of the alkaline earths CaO and SrO amounts to up to 1.5 wt. % and the BaO content is 0 to 1.5 wt. %.

CaO or SrO are preferably contained, each with contents greater than 0.05 wt. %, since they are particularly effective for devitrification resistance. A particularly preferred minimum amount of 0.1 wt. % results for the sum CaO+SrO. A particularly preferred upper limit for CaO+SrO lies at 1.2 wt. %. The SrO amount is preferably 0.05-1.5 wt. %. The CaO amount is preferably 0.05-0.8 wt. %. CaO and SrO increase the refractive index less than BaO and are thus advantageous for equilibrating the refractive index of the residual glass and the high-quartz mixed crystals.

The scattering can be minimized by short ceramicizing times. These will counteract the devitrification by mullite and Zr-containing crystals such as Baddeleyite or zirconium silicate.

The BaO content amounts to a maximum of 1.5 wt. %, since otherwise scattering increases with short ceramicizing times. Obviously, higher contents increase the refractive index of the residual glassy phase in a disadvantageous way. Preferably, the BaO amount is at least 0.1 wt. %.

The sum of the alkaline earths CaO+SrO+BaO is preferably 0.2 to 2 wt. % and particularly preferred, 0.4 to 1.8 wt. %. In this range, the transparency (scattering, color) is favorably established, if operation is conducted with short ceramicizing times. This is attributed to advantageously establishing the composition of the residual glassy phase.

For minimizing scattering in the case of short ceramicizing times of less than 200 min, preferably less than 90 min, it has been demonstrated as advantageous to establish in a targeted manner the ratio of the divalent components MgO and ZnO, which are incorporated into the high-quartz mixed-crystal phase to the components CaO, SrO, BaO, which are incorporated into the residual glass.

MgO and ZnO are incorporated into the hexagonal high-quartz mixed crystals and influence therein the lattice constants a and c and thus the refractive index of the high-quartz mixed crystals. It is also known that the incorporation of Mg or Zn instead of Li reduces the anisotropy of the high quartz, i.e., the difference between the a and c axis. (Müller, "Volumen und thermische Ausdehnung von Aluminosilikat-Mischkristallen mit h-Quarz-Struktur" ["Volume and thermal expansion of aluminosilicate mixed crystals with h-quartz structure"], Fortschr. Miner. 63, pp. 7-20 (1985)). Possibly, the surprising positive effect of establishing the components that was found here is also based on a reduction in the double refraction of the crystals.

The components CaO, SrO and BaO cannot be incorporated into the high-quartz mixed-crystal phase and remain in the residual glassy phase. Here, they influence the refractive index of the residual glassy phase. It is therefore of advantage if the content of MgO+ZnO is greater than that of CaO+SrO+BaO (condition B1).

In addition, it has been shown that a specific ratio of the divalent components MgO+ZnO to the components CaO+SrO+BaO is advantageous in order to reduce the light scattering with rapid ceramicizing (short ceramicizing times).

A ratio of the total content of the components MgO+ZnO to CaO+SrO+BaO of greater than 1 to less than 3 (condition B2) is advantageous.

A ratio of the components MgO+ZnO to CaO+SrO+BaO of greater than 1.5 to less than 3, in particular from 1.7 to less than 3, is particularly advantageous. In this range, in combination with the narrowly specified compositions of the individual components, the desired effect of a minimizing of the light scattering with rapid ceramicizing is established in a particularly advantageous way.

With these conditions for the components, it is possible to optimize the microstructure so that short ceramicizing times with reduced light scattering are possible. Since in the case of short ceramicizing times, the formation of color complexes is reduced with suitable design of the ceramicizing program, the absorption thereof can also be reduced. Therefore lower hue c* values and higher light transmission are possible. Thus, with a rapid ceramicizing at a ceramicizing time of less than 90 min, preferably less than 80 min, a light transmission Y of greater than 82% and a hue c* of less than 5 will be attained with visually inconspicuous scattering. The further reduction of the hue c* to values of less than 4.5 and preferably less than 4 is preferred.

The features of the glass ceramics according to the invention are thus preferably based on the combination of a defined composition with an adapted rapid ceramicizing, as it is described in the examples.

The glass ceramics according to the invention contain high-quartz mixed crystals as the main crystal phase.

In addition, it is advantageous to minimize the crystallite size in order to minimize the scattering.

The high-quartz mixed crystals of the glass ceramics after ceramicizing preferably possess an average crystallite size of less than 45 nm, preferably less than 40 nm. The average crystallite size preferably amounts to at least 20 nm.

The crystal phase fraction of the high-quartz mixed crystals of the glass ceramics preferably amounts to 60-85 wt. %, in particular 65-80 wt. %.

The crystal phase fraction shall amount to at least 60 wt. %, since this is advantageous for establishing the low thermal expansion. The crystal phase fraction preferably amounts to less than 80 wt. %. With higher values, due to the resulting heat of crystallization, it is difficult to ceramicize crystallizable glasses in a short time without deformation. Based on the higher values for the heat of crystallization, which occur non-uniformly in the volume during crystallizing of the glass ceramics, and the greater rigidity of the glass ceramics, longer times are required in order to obtain deformation-free glass-ceramic articles, such as flat plates or panels, for example.

Secondary crystal phases are the mixed crystals forming during nucleation from the nucleating agents $TiO_2$, $ZrO_2$ and/or $SnO_2$ as well as crystals of the keatite mixed-crystal type. The content of secondary crystal phases in the glass ceramics shall preferably amount to less than 8 wt. %, more preferably to less than 6 wt. %. Otherwise, due to the high refractive index of the nucleating-agent crystals in comparison to the residual glass or due to the larger crystallite size of the keatite mixed crystals, there is a disruptive light scattering of the glass ceramics, since in keatite mixed crystals, the average crystallite size usually amounts to at least 100 nm. The accompanying light scattering makes itself noticeable in transparent glass ceramics as very disruptive white turbidity.

The transparent lithium aluminum silicate glass ceramics according to the invention contain additives of $Nd_2O_3$ in contents of 0.005 wt. % (50 ppm) to 0.15 wt. % (1500 ppm). Preferred lower limits for $Nd_2O_3$ are 0.01 wt. %, particularly preferred 0.03 wt. %, in particular 0.04 wt. %. The addition of $Nd_2O_3$ acts as a physical decolorant and reduces the disruptive coloring based on Fe/Ti and Sn/Ti color complexes. Below 50 ppm $Nd_2O_3$ the effect is small, while above 1500 ppm the cost of raw materials increases in a disadvantageous manner, since the $Nd_2O_3$ is an expensive batch raw material. Preferably, the upper limit is thus 1000 ppm.

The oxides $Li_2O$, $Al_2O_3$ and $SiO_2$ in the preferred, indicated limits are components of the high-quartz mixed crystals.

A minimum content of $Li_2O$ of 3.2 wt. % is necessary for a high rate of ceramicizing and for lowering the $10^2$ temperature and the processing temperature $V_A$. Contents higher than 4.2 wt. % are economically disadvantageous due to the high cost of Li raw materials. A content of less than 4 wt. % is particularly advantageous.

In order to avoid higher viscosities of the initial glass and the undesired devitrification of mullite during the forming, the $Al_2O_3$ content is preferably limited to a maximum of 23 wt. %. The minimum content for the formation of sufficient quantities of the high-quartz mixed-crystal phase is 19 wt. %, preferably 20 wt. %.

The $SiO_2$ content shall amount to a maximum of 68 wt. %, since this component greatly increases the viscosity of the glass and thus $V_A$ and the $10^2$ temperature. For good melting of the glasses and for low melting and forming temperatures, higher contents of $SiO_2$ are uneconomical.

The content of $SiO_2$ shall amount to at least 64 wt. %, since this is advantageous for the required properties, such as, e.g., chemical stability, rate of ceramicizing and transparency. The scattering is reduced due to the high $SiO_2$ content, which indicates that the refractive indices of the crystal phase and the residual glass will be better adapted to one another. The $SiO_2$ content is preferably from 65 to 68 wt. %.

The addition of the alkalis $Na_2O$ and $K_2O$ improves the meltability and the devitrification resistance in the forming of the glass. The melting of the difficultly soluble raw materials for $ZrO_2$ and $SiO_2$ is accelerated and the $10^2$ temperature and the processing temperature are reduced. The sum of the alkalis $Na_2O+K_2O$ shall preferably be at least 0.1 wt. %, more preferably at least 0.2 wt. %.

The contents must be limited, however, since these components are not incorporated in the crystal phases, but remain in the residual glassy phase of the glass ceramics. Contents that are too high adversely affect the crystallization behavior during the transformation of the crystallizable initial glass into the glass ceramics, here in particular for loads with short ceramicizing times. In addition, higher contents act unfavorably on the time/temperature resistance of the glass ceramics. The sum of the alkalis $Na_2O+K_2O$ preferably amounts to a maximum of 1.5 wt. %, and more preferably, a maximum of 1.2 wt. %.

The alkalis $Na_2O$, $K_2O$ and the alkaline earths CaO, SrO, BaO accumulate outside in the residual glassy phase between the crystals, also on the surface of the glass ceramics. During the ceramicizing, an approximately 200 to 1000 nm thick glassy surface layer forms, which is almost free of crystals and which is enriched with these elements, whereby $Li_2O$ is depleted.

This glassy surface layer acts favorably on the chemical stability of the glass ceramics. In the case of fireplace panels, the attack of sulfur-containing acids from flue gases is reduced. Since the high-quartz mixed crystals are particularly attacked, whereby this leads to crack formation in the glass ceramics, the glassy surface layer acts in a passivating manner. For this reason, the minimum contents of $Na_2O+K_2O$ as well as $CaO+SrO+BaO$ are advantageous.

$TiO_2$, $ZrO_2$ and/or $SnO_2$ are provided as nucleating agents. During nucleation, the components form mixed crystals, on which the high-quartz mixed crystals grow.

The $ZrO_2$ content is preferably limited to less than 2 wt. %, since higher contents adversely affect the melting behavior of the batch during the glass production, and the devitrification stability during forming can be adversely affected due to the formation of Zr-containing crystals. The minimum content is 1.2, preferably 1.5 wt. % in order to assure a sufficiently rapid nucleation.

The component $TiO_2$ is a very effective and important component for short ceramicizing times. The $TiO_2$ content shall amount to at least 1.6 wt. % and less than 2.5 wt. %. Contents higher than 2.5 wt. % are a disadvantage for the hue c* due to the formation of Fe/Ti and Sn/Ti color complexes.

The component $SnO_2$ is preferably limited to values of 0.5 wt. % at most due to the devitrification resistance. Higher contents lead to the crystallization of Sn-containing crystal phases on contact materials (e.g., Pt/Rh) during forming and are to be avoided. Due to the formation of Sn/Ti color complexes, the content of $SnO_2$ is to be selected as small as possible, and the minimum required amount is determined by the requirement for a sufficient refining effect.

The smallest amount of $SnO_2$ is preferably 0.05 wt. %, particularly preferred 0.08 wt. %, in particular >0.1 wt. %.

The sum of the nucleating agents $TiO_2+ZrO_2+SnO_2$ shall preferably amount to 3.5 to 5 wt. %. The minimum content is necessary for a sufficiently rapid nucleation. The upper limit of 5 wt. % results from the requirement for devitrification resistance.

Due to the high cost of low-iron batch raw materials, it is uneconomical to limit the $Fe_2O_3$ content of the glass ceramics to values of 0.01 wt. % (100 ppm) and below. Also, since an input of iron occurs during the recycling of shards due to crushing, an $Fe_2O_3$ content of greater than 0.011 wt. %, in particular of greater than 0.013 wt. % is economically particularly advantageous.

On the other hand, the concentration of Fe/Ti color complexes increases with the $Fe_2O_3$ content of the glass ceramics. The coloring (hue c*) is enhanced and the light transmission Y (brightness) is reduced due to absorption. For this reason, the glass ceramics shall contain 0.03 wt. % at most, preferably up to 0.022 wt. %, in particular up to 0.025 wt. % $Fe_2O_3$.

Additions of CoO in amounts of up to 30 ppm can support the decoloring. A CoO content of 0.1 ppm to 20 ppm CoO is preferred.

As the refining agent, preferably at least one is selected from the group $SnO_2$, sulfate and halide compounds, which are added to the batch for the melt in amounts of up to 1.5 wt. %. $SnO_2$ is preferably used in contents greater than 0.05 wt. %, in particular greater than 0.08 wt. %.

Upon addition of halide compounds, for the most part these compounds vaporize and enter into the atmosphere of the melting tank. Corrosive compounds such as HF, HCl and HBr are formed thereby. These are disadvantageous due to the corrosion of the refractory bricks in the melting tank and in the exhaust-gas line. It is therefore preferred that halide compounds are not added as a refining aid.

As a refining agent, 0.08 to 0.25 wt. % of $SnO_2$, preferably 0.05 wt. % to less than 0.25 wt. % of $SnO_2$, is contained. The minimum quantity of 0.05 wt. %, in particular of 0.08 wt. %, is necessary for a sufficient refining effect. In order to improve the devitrification resistance and due to the coloring by Sn/Ti color complexes, the content is limited to 0.25 wt. %, in particular to less than 0.25 wt. %. The $SnO_2$ content is preferably greater than 0.1 wt. %, in order to improve the bubble quality with economical tank throughputs. Preferred ranges for $SnO_2$ are >0.05 to 0.2 wt. %, in particular 0.08 to 0.14 wt. %. As further additional refining aids, in particular, sulfate compounds and/or chlorine compounds can be added to the batch for the melt. The total content of refining agents shall amount to up to 1.5 wt. %.

For reducing the color, it is advantageous to use quantities of the refining agent $SnO_2$ that are as small as possible. In order to obtain a sufficient refining effect with the required bubble qualities and tank throughputs, it is advantageous to carry out a high-temperature refining above 1700° C., preferably above 1750° C. The content of $SnO_2$ in this case is preferably greater than 0.10 to 0.25 wt. % at most, particularly preferably >0.05 wt. % to 0.2 wt. %. A bubble quality of less than 2 bubbles/kg is achieved in the glass or glass ceramics (measured from bubble sizes greater than 0.1 mm in one dimension).

This is preferably associated with a hue c* of less than 5 in the glass ceramics. Preferably, values of less than 4.5 and further, less than 4, are achieved. A high-temperature refining of at least 1800° C. permits higher tank throughputs, since the release of the refining oxygen is accelerated. Of course, higher refining temperatures can increase the formation of $Sn^{2+}$ as well as $Fe^{2+}$ and thus the concentration of the color complexes, so that here, another optimization is necessary.

In order to improve the refining, further refining aids such as sulfate and halide (F, Cl, Br) compounds can additionally be added to the melt. The additives are usually limited to quantities of up to 1.5 wt. %.

In the refining, the refining aids vaporize for the most part. With the preferred addition of sulfate compounds and the omission of halide compounds, the sulfur escapes nearly completely, except for a few ppm as a consequence of the small solubility in glass.

According to a first embodiment, the transparent lithium aluminum silicate glass ceramic contains the components (in wt. % based on oxide) as main components:

| | |
|---|---|
| $Li_2O$ | 3.2-4.2 |
| $Na_2O + K_2O$ | 0.1-1.5 |
| MgO | 0.2-1.0 |
| CaO + SrO | 0-1.5 |
| BaO | 0-1.5 |
| CaO + SrO + BaO | 0.2-2 |
| ZnO | 1-2.5 |
| $Al_2O_3$ | 19-23 |
| $SiO_2$ | 64-68 |
| $TiO_2$ | 1.6-<2.5 |
| $ZrO_2$ | 1.2-<2.0 |
| $SnO_2$ | 0-0.5 |
| $Nd_2O_3$ | 0.005-0.15 |
| $Fe_2O_3$ | >0.01-0.03 |

According to another embodiment, the transparent lithium aluminum silicate glass ceramic, or the article produced therefrom, preferably has a composition of the glass ceramic, which contains in wt. % based on oxide:

| | |
|---|---|
| Li$_2$O | 3.2-<4.0 |
| Na$_2$O + K$_2$O | 0.2-1.2 |
| MgO | 0.3-0.9 |
| CaO + SrO | 0.05-1.5 |
| BaO | 0-1.5 |
| CaO + SrO + BaO | 0.4-1.8 |
| ZnO | >1.5-2.2 |
| B$_2$O$_3$ | 0-1 |
| Al$_2$O$_3$ | 20-23 |
| SiO$_2$ | 65-68 |
| TiO$_2$ | 1.6-<2.5 |
| ZrO$_2$ | 1.5-<2.0 |
| SnO$_2$ | >0-0.5 |
| TiO$_2$ + ZrO$_2$ + SnO$_2$ | 3.5-5 |
| P$_2$O$_5$ | 0-2 |
| Nd$_2$O$_3$ | 0.005-0.1 |
| Fe$_2$O$_3$ | >0.013-0.025 |

According to another embodiment, the transparent lithium aluminum silicate glass ceramic, or the article produced therefrom, preferably has a composition of the glass ceramic, which contains in wt. % based on oxide:

| | |
|---|---|
| Li$_2$O | 3.2-<4.0 |
| Na$_2$O + K$_2$O | 0.2-1.2 |
| MgO | 0.3-0.9 |
| CaO + SrO | 0.05-1.5 |
| BaO | 0-1.5 |
| CaO + SrO + BaO | 0.4-1.8 |
| ZnO | >1.5-2.2 |
| B$_2$O$_3$ | 0-1 |
| Al$_2$O$_3$ | 20-23 |
| SiO$_2$ | 65-68 |
| TiO$_2$ | 1.6-<2.5 |
| ZrO$_2$ | 1.5-<2.0 |
| SnO$_2$ | >0-0.5 |
| TiO$_2$ + ZrO$_2$ + SnO$_2$ | 3.5-5 |
| P$_2$O$_5$ | 0-2 |
| Nd$_2$O$_3$ | 0.005-0.1 |
| Fe$_2$O$_3$ | >0.011-0.025 |

For improving the meltability and devitrification resistance, up to 1 wt. % B$_2$O$_3$ and 2 wt. % P$_2$O$_5$ can be contained. Higher contents are disadvantageous for the chemical stability and the time/temperature resistance of the glass ceramics. The glass ceramics are preferably technically free of B$_2$O$_3$ and P$_2$O$_3$, i.e., the contents lie below 0.3 wt. %.

In order to further improve the economical production with good transparency using short ceramicizing times, the transparent lithium aluminum silicate glass ceramic, or the article produced therefrom, has a particularly preferred composition of the glass ceramic, which contains in wt. % based on oxide:

| | |
|---|---|
| Li$_2$O | 3.4-3.9 |
| Na$_2$O + K$_2$O | 0.2-1.0 |
| MgO | 0.4-0.9 |
| CaO + SrO | 0.1-1.2 |
| BaO | 0-1.3 |
| CaO + SrO + BaO | 0.6-1.6 |
| ZnO | >1.5-2.0 |
| B$_2$O$_3$ | 0-1 |
| Al$_2$O$_3$ | 20-23 |
| SiO$_2$ | 65-68 |
| TiO$_2$ | 1.8-<2.5 |
| ZrO$_2$ | 1.5-1.9 |
| SnO$_2$ | 0.08-0.25 |
| TiO$_2$ + ZrO$_2$ + SnO$_2$ | 3.6-4.8 |
| P$_2$O$_5$ | 0-1 |
| Nd$_2$O$_3$ | 0.01-0.1 |
| Fe$_2$O$_3$ | >0.013-0.022 |

In order to further improve the economical production with good transparency using short ceramicizing times, the transparent lithium aluminum silicate glass ceramic, or the article produced therefrom, has a particularly preferred composition of the glass ceramic, which contains in wt. % based on oxide:

| | |
|---|---|
| Li$_2$O | 3.4-3.9 |
| Na$_2$O + K$_2$O | 0.2-1.0 |
| MgO | 0.4-0.9 |
| CaO + SrO | 0.1-1.2 |
| BaO | 0-1.3 |
| CaO + SrO + BaO | 0.6-1.6 |
| ZnO | >1.5-2.0 |
| B$_2$O$_3$ | 0-1 |
| Al$_2$O$_3$ | 20-23 |
| SiO$_2$ | 65-68 |
| TiO$_2$ | 1.8-<2.5 |
| ZrO$_2$ | 1.5-1.9 |
| SnO$_2$ | 0.05-<0.25 |
| TiO$_2$ + ZrO$_2$ + SnO$_2$ | 3.6-4.8 |
| P$_2$O$_5$ | 0-1 |
| Nd$_2$O$_3$ | 0.01-0.1 |
| Fe$_2$O$_3$ | >0.011-0.022 |

In the above-named composition examples, it should be considered that the listed components amount to at least 98 wt. %, usually 99 wt. % of the total composition. A plurality of elements such as, e.g., F, Cl, B, P, the alkalis Rb, Cs, or elements such as Mn, Hf are the usual impurities in the batch raw materials used in large-scale production. Other compounds, such as, e.g., of the elements W, Nb, Y, Mo, rare earths, Bi may be contained in small amounts.

For glass ceramics, the value c* (hue, color) from the CIELAB color system with the coordinates L*, a*, b* has been adopted as measurement for the coloring. In measurement with standard light C, 2° observer angle in the case of a 4-mm thick, polished glass-ceramic sample, the color c* of the LAS glass ceramics preferably amounts to less than 5.5, more preferably less than 5, and particularly preferably less than 4.5.

The light transmission of the LAS glass ceramics measured in the CIE color system as light transmission Y (brightness) amounts to at least 81%, preferably at least 83% The values are valid as measured with standard light C, 2° observer angle for a 4-mm thick, polished glass-ceramic sample.

Preferably, the LAS glass ceramics have no visually related scattering.

The scattering is evaluated as good visually when viewing the polished edges of a 4 to 7 cm long glass-ceramic sample. The reference here is the arsenic-refined, transparent glass ceramics ROBAX® of the company SCHOTT AG. The latter provides very little scattering.

The measurement of the turbidity (English: haze) according to ASTM D1003 preferably amounts to less than 1.5%, and particularly preferably less than 1% for 4-mm thick, polished specimens of the LAS glass ceramics. The haze measurement correlates with the visual measurement of the scattering, but of course, the haze measurement cannot replace the visual method, particularly for small values of around 1%.

A visually disruptive scattering is avoided by maintaining the limit values. In the case of small haze values of approximately 1%, it is recommended to combine both methods.

A high transparency of the glass ceramics is achieved by the ratio of the divalent components MgO and ZnO to the alkaline earths CaO, SrO and BaO according to the invention, employing rapid ceramicizing of less than 90 min.

Preferably, the LAS glass ceramics have a light transmission (brightness) Y of preferably greater than 82%, more preferably greater than 84%. The color c* is preferably smaller than 5.5, more preferably smaller than 5, and particularly preferably smaller than 4.5, in particular smaller than 4, measured at 4-mm thickness with standard light C and 2° observer angle, and the LAS glass ceramics preferably have no visually disruptive light scattering.

In contrast to the known arsenic-refined transparent glass ceramics, the glass ceramics according to the invention have the advantage of lower values of compaction and thus a higher temperature resistance.

The water content of the initial glasses for the production of the transparent glass ceramics preferably lies between 0.015 and 0.06 mol/L, depending on the selection of the batch raw materials and the process conditions in the melt. This corresponds to 13-0H values of 0.16 to 0.64 $mm^{-1}$ for the crystallizable initial glasses.

The low melting temperature important for economical production is assured by a lower viscosity of the glass melt at high temperatures. The temperature at which the viscosity of the glass melt is $10^2$ dPas is a characteristic value therefor. This so-called $10^2$ temperature for the glass ceramics according to the invention preferably lies at less than 1770° C., more preferably less than 1760° C., for the melt of the initial glasses.

The low viscosity of the melt at high temperatures permits the temperature in the melting tank to be set lower and thus prolongs the service life of the melting tank, since the corrosion of the refractory bricks is reduced. In addition, the power consumption relative to the quantity of glass ceramics produced is reduced due to the low glass viscosity. A low $10^2$ temperature thus also contributes to the environmental friendliness of the glass ceramics. Since a low glass viscosity also promotes bubbles to rise and thus promotes refining, a low glass viscosity is also advantageous for high tank throughputs, since the melting and refining proceed more rapidly.

After refining, good bubble qualities are preferably those having bubble numbers of less than 5 bubbles/kg, more preferably less than 2 bubbles/kg in the crystallizable initial glass or in the glass ceramics (measured from bubble sizes greater than 0.1 mm in one dimension).

It is also economically advantageous to decrease the temperature during forming, since the service lives of the forming tools can be increased thereby and less heat loss results. The forming, mostly rolling or floating, occurs at a viscosity of $10^4$ dPas for the glass melt. This temperature is also called the processing temperature $V_A$ and preferably is below 1325° C., more preferably below 1320° C., for the glass ceramics according to the invention.

The transparent glass ceramics shall provide a sufficient devitrification resistance in the forming from the melt. Otherwise, crystals form that reach a critical size during the forming when in contact with the forming material (e.g., platinum/rhodium in the drawing nozzle in the rolling process). These are then visually striking for the most part and are critical for the strength of the later glass ceramics.

The limiting temperature, below which critical devitrification occurs, i.e., the upper devitrification limit (OEG) preferably lies at least 10° C. below the processing temperature $V_A$. A sufficient process window for the forming process is defined with this minimum difference. A process window $V_A$-OEG, which amounts to at least 20° C., is advantageous.

The preferred geometry for the transparent, low-color glass ceramic, or the article produced therefrom, is in the form of plates or panels. The panel preferably has a thickness of 2.5 to 14 mm, since this will afford important applications.

Preferred uses of the LAS glass ceramics are those such as fireplace viewing windows, fire-resistant glazing, display panels, cooktops, as well as safety glazing with mechanical or ballistic protective effect.

With lesser thicknesses, strength is adversely affected; greater thicknesses are less economical due to the greater material requirement. Except for the application as safety glass, in which high strength matters, the thickness is thus usually selected at less than 6 mm.

Suitable forming methods for the required plate or panel-shaped geometry are rolling and floating.

The glass-ceramic panel and preferably the article produced therefrom thus not only can be shaped planar, but also three-dimensionally. For example, bent, angled or curved panels can be used. The panels may be present in rectangular or other shapes, and in addition to planar regions, may contain three-dimensionally shaped regions, such as, e.g., woks or rolled pieces or surfaces as raised structures or depressions. The geometric shaping of the panels is carried out by hot forming, such as, e.g., by structured forming rollers or by downstream hot forming of the initial glasses, e.g., by burners or by gravity sinking. During ceramicizing, operation is conducted with supporting ceramic molds, in order to avoid uncontrolled changes in the geometric shape.

The transparent lithium aluminum silicate glass ceramics containing high-quartz mixed crystals as the main crystal phase preferably find use as fireplace panels, fire-resistant glass, safety glass, baking oven viewing panels, in particular for cleaning ovens, or as coverings for high-power lights.

By introducing an opaque coating on the upper side and/or underside, a colored cooktop with the required covering can be produced from the transparent glass ceramics, in order to prevent a view onto the technical components underneath the cooktop.

Recesses in the coating permit introducing sensor regions, and colored and white indicators as well as displays.

It is possible to combine coatings on the upper side and underside of the transparent glass-ceramic panel and also to include partially transparent layers. In addition, markings can be introduced, e.g., for cooking zones. In this way, the known different types of coatings, such as, e.g., with ceramic decorating colors, lustrous colors, silicone-based and sol-gel-based colors, sputtered layers, etc. can be combined.

Indicators are composed of electronic components emitting light, for the most part light diodes. All forms of indicators are possible, punctiform as well as those with flat surface area. The emission spectra of the emitting indicators can have one or more maxima and broad regions, so that the indicators appear colored or white. Based on the small hue c* value of the glass ceramics, black/white and colored displays or image screens also can be disposed under the glass ceramics; these are visible from outside without disruptive color distortion. Optionally, the color of the indicators for the observer can be changed or corrected by color filters or color layers, preferably introduced on the underside. In addition, the color of the indicator can be changed in a targeted manner in order to allow the appearance, for example, of a typical standard indicator in different shades of color. Thus, customer-specific differentiations in color shade can be represented at low cost. The color shade of the indicator can also be corrected, if need be, by changing it when passing through the glass ceramics.

The heating of the cooktop is conducted as usual with gas burners, radiant heaters, or inductively.

In the case of fireplace panels, a good view onto the combustion space and the flames is desired. In the case of cooktops with colored coating on the underside, the color of the underside coating will not be distorted by the color of the glass ceramics.

For the named uses, a light transmission (brightness) Y of greater than 82%, preferably greater than 84%, and the low hue c* of less than 5.5, preferably less than 5, and particularly preferred less than 4.5, in particular <4, measured with 4-mm thickness using standard light C and 2° observer angle, and no visually disruptive light scattering are preferred.

After transformation into glass ceramics with keatite mixed crystals as the main crystal phase, the glass ceramics find use in translucent or opaque form preferably as a covering panel in microwave ovens or lining of combustions spaces. In this case, the light transmission amounts to less than 15%. With use as translucent white cooktops, the light transmission of a glass-ceramic panel with higher values can be reduced to one with lower values by using an underside coating. In this way, regions, e.g., for indicators can remain uncoated.

The present invention will be clarified on the basis of the following examples.

The transmission curve of the glass ceramics from Example 21 is shown in the single FIGURE.

The initial glasses from raw materials common in the glass industry were melted at temperatures of approximately 1620° C. for 4 hours. After the melting of the batch in crucibles of sintered silica glass, the melts were cast into Pt/Rh crucibles with inner crucible of silica glass and homogenized at temperatures of 1550° C. for 30 minutes with stirring. After this homogenizing, the glasses were refined for 2 hours at 1640° C. Subsequently, pieces of approximately 140×140×30 mm³ size were cast and cooled to room temperature, starting from 660° C., in a cooling oven. The cast pieces were divided into the sizes required for the investigations and for the ceramicizing.

The compositions and properties of the crystallizable initial glasses for transparent glass ceramics are listed in Table 1 for several embodiment examples. Glasses 1 to 8 involve glasses according to the invention and glasses 9, 10 involve comparative glasses outside the present invention. The compositions of the comparative glasses are outside the invention and display the described disadvantages relative to their manufacturing properties. Due to typical impurities in the batch raw materials used on a large technical scale, the compositions do not add up to precisely 100 wt. %. Typical impurities, even if they are introduced unintentionally into the composition, are F, Cl, B, P, Mn, Rb, Cs, Hf, which usually amount to less than 0.1 wt. %. They are often entrained via the raw materials for related components; thus, e.g., Rb and Cs are entrained by Na or K raw materials, or Hf by Zr raw material.

The water content of the glasses measured with IR spectroscopy is indicated in Table 1.

The properties in the glassy state, such as, e.g., transition temperature Tg, processing temperature $V_A$, $10^2$ temperature, upper devitrification limit OEG, the density, as well as transmission values measured on 4-mm thick polished glasses with standard light C, 2°, are also listed in Table 1. The glasses are melted in Pt/Rh10 crucibles for measurement of the OEG. Subsequently, the crucibles are kept for 5 hours at different temperatures in the region of the processing temperature. The uppermost temperature at which the first crystals appear on the contact surface of the glass melt relative to the crucible wall determines the OEG.

Table 2 shows the ceramicizing conditions and properties of the glass ceramics produced with ceramicizing program 1 and Table 3 shows the same with ceramicizing program 2.

In the case of ceramicizing program 1, heating is conducted up to a temperature of 600° C. in the ceramicizing oven in 20 min. The temperature range from 700 to 810° C. is important for the nucleation. The temperature increase in this region is adapted to the respective composition, so that a light scattering by crystallites that are too large is avoided. Above approximately 810° C., crystallization of the desired high-quartz mixed-crystal phase occurs. In this region, the formation of the disruptive Fe/Ti and Sn/Ti color complexes continues. At the maximum temperature $T_{max}$, the composition of crystals and residual glass is established and the microstructure is homogenized. With this, the chemical and physical properties are also established. In ceramicizing program 1, a holding time $t_{nucleation}$ is introduced in the region of nucleation at the temperature $T_{nucleation}$. Also, the maximum temperature $T_{max}$ and holding time $t_{max}$ will be adapted individually to the composition. The values as well as the total ceramicizing time are indicated in Table 2.

Ceramicizing Program 1:

Rapid heating from room temperature to 600° C. in 20 min,
Temperature increase from 600° C. to the nucleation temperature $T_{nucleation}$ at a heating rate of 5° C./min, holding time $t_{nucleation}$ of 30 min at $T_{nucleation}$, further heating at 2.5° C./min to 800° C.,
Temperature increase from $T_{nucleation}$ to the maximum temperature $T_{max}$, with a heating rate of 2.5° C./min, holding time $t_{max}$ of 10 min at $T_{max}$, and
Cooling to 700° C. at 6° C./min, then rapid cooling to room temperature.

The unsatisfactory color of several examples in Table 2 with values of c*>5.5 show the necessity of improving the color by an optimized ceramicizing program. Ceramicizing program 2 is optimized for the compositions according to the invention in the direction of short ceramicizing times and improved transparency, i.e., higher light transmission and lower hue c* values. In comparison to program 1, the nucleation times should only be shortened to an extent such that the scattering is not visually striking. In a roller kiln, which enables high heating rates, heating is conducted to 720° C. in 10 min. For the compositions according to the invention, this is the temperature starting from which a significant nucleation rate ensues. In the region of high nucleation rates, the temperature is continually increased up to 810° C. with adapted heating rate. In this temperature region, the time is selected so that no visually disruptive scattering occurs.

Above 810° C. due to the further proceeding formation of the color complexes, the heating rate is increased. The time in this temperature region is selected so that with the compositions according to the invention it is assured that the planarity of the glass-ceramic panels is satisfactory. The greatest deviations from planarity amount to less than 0.3% of the edge length of the panel. The crystallization and establishment of the microstructure (crystal and residual glass composition) are completed in this temperature region and at the maximum temperature. The ceramicizing time of this program is 68 min.

Ceramicizing Program 2:

Rapid heating from room temperature to 720° C. in 10 min,
Temperature increase from 720 to 810° C. in 36 min,
Temperature increase from 810° C. to maximum temperature 920° C. in 10 min, holding time of 7 min at $T_{max}$, and
Cooling to 780° C. in 4.5 min, then rapid cooling to room temperature by withdrawal of heat.

The transmission measurements were conducted on polished panels of 4-mm thickness with standard light C, 2°. For the measurements on the transparent glass ceramics (Table 2 or Table 3), the transmission values are indicated at the selected wavelengths and light transmission. The terms light transmission and brightness Y correspond to the same measured value, measured according to DIN 5033.

The color coordinates L*, a*, b* in the CIELAB system and the c* value are given as the measurements for the color. The yellowness index according to the ASTM Standard 1925/70 (77, 85) is also indicated as a measure for the coloring.

The scattering is evaluated visually when viewing through the polished edges of a 4-mm thick, polished glass-ceramic sample. The scattering is measured via limit patterns and ranges from a scale of 0 (no scattering, such as, e.g., in the initial glasses of Table 1), then 1 (very slight scattering as in the glass ceramics ROBAX® of the company SCHOTT AG), 2 (slight scattering) to 10 (translucent, milky appearance). Values of 3 and higher are viewed as disadvantageous for the requirements of the market, since the scattering can already be visually disruptive under certain lighting conditions.

For the more rapid ceramicizing program 2, which is more critical relative to light scattering, the haze value was also determined in Table 3. In this case, the turbidity is measured with standard light C on both sides of polished, 4-mm thick panels with a commercial measuring instrument "Haze-gard plus" of the company BYK-Gardner and is characterized as the haze value.

In Table 2, for ceramicizing program 1, additional properties of the glass ceramics, such as infrared transmission at 1600 nm, thermal expansion between 20 and 700° C., density, and the phase content of the main crystal phase composed of high-quartz mixed crystals, which is measured by means of X-ray diffraction, as well as the average crystallite size are shown. The relevant compaction for the temperature resistance during use was determined by annealing at 700° C., 15 h of 100-mm-long rods or bars of the glass ceramics produced with program 1. In comparison to the glass ceramics ROBAX® of the company SCHOTT AG with a good value for compaction of 21 μm, these represent further improved values.

Examples 9, 10 in Table 2 and Examples 19, 20 in Table 3 are comparative glass ceramics outside the invention, which were produced from the listed, crystallizable comparative glasses. The comparative examples show the described disadvantages for transparency (color and scattering).

In an additional Example No. 21, a composition of the following was melted on an industrial scale: $Li_2O$ 3.71 wt. %, $Na_2O$ 0.51 wt. %, $K_2O$ 0.10 wt. %, MgO 0.62 wt. %, CaO 0.24 wt. %, SrO 0.53 wt. %, BaO 0.52 wt. %, ZnO 1.80 wt. %, $Al_2O_3$ 21.5 wt. %, $SiO_2$ 66.2 wt. %, $TiO_2$ 2.16 wt. %, $ZrO_2$ 1.77 wt. %, $SnO_2$ 0.18 wt. %, $Nd_2O_3$ 0.053 wt. %, and $Fe_2O_3$ 0.014 wt. %. The composition is optimized corresponding to the requirements for economical production and transparency of a lithium aluminum silicate glass ceramic.

It is characterized by low $10^2$ temperature, low processing temperature and good devitrification resistance.

The glass melt was refined at high temperatures of approximately 1800° C., 15 min. The bubble quality of this glass was excellent and was <2 bubbles/kg of glass. A glass strip of 4-mm thickness that was smooth on both sides was rolled during forming and cooled in a cooling oven in order to avoid buildup of stress. Plates with dimensions of 500×500×4 mm were cut from this glass strip and ceramicized in an industrial-scale roller kiln. The ceramicizing program corresponded to program 2 and the crystallizable glass plates were positioned on a ceramic planar base plate. The transparent glass-ceramic plates that were obtained provided a very good planarity of <0.3% of the edge length.

The transmission curve of these glass ceramics according to the invention is shown in the FIGURE. The transparency corresponds to the advantageous values of the invention with light transmission Y of 82.7%, hue c* of 4.4 and without visually disruptive scattering. The measurement was conducted again with standard light C on 4-mm thick plates polished on both sides. The haze value was determined to be 0.9%.

In another Example No. 22, the composition of the industrial-scale glass melt was varied in order to further improve the transmission. The composition of the glass was: $Li_2O$ 3.77 wt. %, $Na_2O$ 0.51 wt. %, $K_2O$ 0.11 wt. %, MgO 0.63 wt. %, CaO 0.24 wt. %, SrO 0.54 wt. %, BaO 0.52 wt. %, ZnO 1.80 wt. %, $Al_2O_3$ 21.3 wt. %, $SiO_2$ 66.5 wt. %, $TiO_2$ 2.20 wt. %, $ZrO_2$ 1.77 wt. %, $SnO_2$ 0.11 wt. %, $Nd_2O_3$ 0.055 wt. %, and $Fe_2O_3$ 0.013 wt. %. The water content was determined to be 0.040 mol/L.

This glass composition is characterized by good meltability (low $10^2$ temperature of less than 1760° C.), low processing temperature below 1320° C. and good devitrification resistance ($V_A$-OEG>20° C.).

The process parameters for the melt and ceramicizing corresponded to Example 21.

The bubble quality remained at good values of <2 bubbles/kg of glass.

The light transmission Y was 84.6%; the hue c* was 3.5. The sample had no visually disruptive scattering and the haze value was determined to be 0.8%

TABLE 1

Compositions and properties of initial glasses according to the invention and comparative glasses

| | | Glass No. | | | | | | | | | |
|---|---|---|---|---|---|---|---|---|---|---|---|
| | | 1 | 2 | 3 | 4 | 5 | 6 | 7 | 8 | 9 | 10 |
| Composition | wt. % | | | | | | | | | | |
| $Li_2O$ | | 3.73 | 3.59 | 3.52 | 3.57 | 3.66 | 3.75 | 3.69 | 3.66 | 3.40 | 3.44 |
| $Na_2O$ | | 0.49 | 0.50 | 0.35 | 0.26 | 0.38 | 0.45 | 0.49 | 0.49 | 0.14 | 0.61 |
| $K_2O$ | | 0.05 | 0.07 | 0.19 | 0.14 | 0.12 | 0.18 | 0.10 | 0.10 | | 0.24 |
| MgO | | 0.73 | 0.83 | 0.89 | 0.93 | 0.88 | 0.44 | 0.63 | 0.64 | 0.73 | |
| CaO | | 0.15 | 0.12 | 0.24 | 0.25 | 0.22 | 0.25 | 0.24 | 0.24 | 0.45 | |
| SrO | | 0.36 | 0.50 | 0.53 | 0.49 | 0.49 | 0.49 | 0.52 | 0.53 | 0.52 | |
| BaO | | 0.72 | 0.73 | 0.12 | 0.54 | 0.56 | 0.49 | 0.53 | 0.52 | 2.11 | 2.12 |
| ZnO | | 1.64 | 1.70 | 1.74 | 1.79 | 1.77 | 1.79 | 1.81 | 1.82 | 0.32 | 0.19 |
| $Al_2O_3$ | | 21.5 | 21.3 | 21.4 | 21.0 | 21.1 | 21.5 | 21.5 | 21.6 | 22.2 | 22.3 |
| $SiO_2$ | | 66.4 | 66.4 | 66.7 | 66.7 | 66.5 | 66.4 | 66.2 | 66.2 | 65.8 | 67.0 |
| $TiO_2$ | | 2.10 | 2.11 | 2.17 | 2.26 | 2.19 | 2.18 | 2.18 | 2.38 | 2.14 | 1.77 |
| $ZrO_2$ | | 1.80 | 1.75 | 1.77 | 1.76 | 1.76 | 1.76 | 1.76 | 1.76 | 1.83 | 1.99 |
| $SnO_2$ | | 0.24 | 0.24 | 0.22 | 0.22 | 0.22 | 0.20 | 0.18 | | 0.26 | 0.26 |
| $Fe_2O_3$ | | 0.018 | 0.019 | 0.021 | 0.022 | 0.020 | 0.021 | 0.019 | 0.019 | 0.020 | 0.029 |
| $Nd_2O_3$ | | 0.048 | 0.048 | 0.051 | 0.052 | 0.053 | 0.054 | 0.053 | 0.005 | 0.027 | |
| $H_2O$ content | mol/L | | 0.036 | 0.038 | 0.040 | 0.041 | 0.041 | 0.040 | 0.035 | 0.027 | 0.036 |
| Refining agent addition | wt. % | 0.17 ($SO_3$) | | | | | | | 0.17 ($SO_3$) | | |

TABLE 1-continued

Compositions and properties of initial glasses according to the invention and comparative glasses

| | | Glass No. | | | | | | | | | |
|---|---|---|---|---|---|---|---|---|---|---|---|
| | | 1 | 2 | 3 | 4 | 5 | 6 | 7 | 8 | 9 | 10 |
| Σ CaO + SrO | wt. % | 0.51 | 0.62 | 0.77 | 0.74 | 0.71 | 0.74 | 0.76 | 0.77 | 0.97 | |
| Σ CaO + SrO + BaO | wt. % | 1.23 | 1.35 | 0.89 | 1.28 | 1.27 | 1.23 | 1.29 | 1.29 | 3.08 | 2.12 |
| Σ MgO + ZnO/ Σ CaO + SrO + BaO | | 1.93 | 1.87 | 2.96 | 2.13 | 2.09 | 1.81 | 1.89 | 1.91 | 0.34 | 0.09 |
| Transformation temperature Tg | °C. | 684 | 687 | 682 | 676 | 682 | 679 | 677 | 675 | 708 | 719 |
| Processing temperature | °C. | 1318 | 1320 | 1316 | 1308 | 1311 | 1316 | 1308 | 1313 | 1329 | 1367 |
| $10^2$ Temperature | °C. | 1754 | 1761 | 1758 | 1751 | 1753 | 1788 | 1741 | 1757 | 1758 | 1804 |
| OEG (upper devitrification limit) | °C. | 1290 | 1285 | 1300 | 1280 | 1275 | 1280 | 1285 | 1290 | 1345 | 1400 |
| Devitrification resistance VA - OEG | °C. | 28 | 35 | 16 | 28 | 36 | 36 | 23 | 23 | −16 | −33 |
| Density | g/cm³ | 2.459 | 2.463 | 2.456 | 2.462 | 2.462 | 2.459 | 2.461 | 2.460 | 2.470 | 2.444 |
| Transmission Standard light C, 2° 4-mm thickness | | | | | | | | | | | |
| 400 nm | % | 82.4 | 82.1 | 81.3 | 79.8 | 80.6 | 80.4 | 82.2 | 82.1 | 83.5 | 82.3 |
| Light transmission Y | % | 89.2 | 89.2 | 89.0 | 88.7 | 88.7 | 88.7 | 89.1 | 89.5 | 89.7 | 90.4 |
| Yellowness Index | | 2.6 | 2.8 | 3.0 | 3.8 | 3.4 | 3.5 | 2.7 | 3.7 | 2.4 | 3.7 |
| L* | | 95.6 | 95.6 | 95.6 | 95.4 | 95.5 | 95.5 | 95.6 | 95.8 | 95.9 | 96.2 |
| a* | | −0.6 | −0.6 | −0.7 | −0.7 | −0.7 | −0.7 | −0.6 | −0.5 | −0.5 | −0.6 |
| b* | | 1.5 | 1.6 | 1.7 | 2.2 | 1.9 | 2.0 | 1.5 | 2.0 | 1.3 | 2.1 |
| c* | | 1.6 | 1.7 | 1.9 | 2.3 | 2.0 | 2.1 | 1.6 | 2.1 | 1.4 | 2.1 |

TABLE 2

Properties of glass ceramics according to the invention and comparative glass ceramics (Ceramicizing program 1)

| | | Example No. | | | | | | | | | |
|---|---|---|---|---|---|---|---|---|---|---|---|
| | | 1 | 2 | 3 | 4 | 5 | 6 | 7 | 8 | 9 | 10 |
| Glass No. | | 1 | 2 | 3 | 4 | 5 | 6 | 7 | 8 | 9 | 10 |
| Ceramicizing program | | 1 | 1 | 1 | 1 | 1 | 1 | 1 | 1 | 1 | |
| Nucleation temperature, $T_{nucleation}$, 30 min | °C. | 750 | 740 | 745 | 744 | 740 | 735 | 735 | 735 | 770 | 775 |
| Crystallization $T_{max}$, 10 min | °C. | 897 | 896 | 895 | 892 | 896 | 892 | 892 | 892 | 922 | 944 |
| Ceramicizing time | min | 182 | 183 | 182 | 180 | 183 | 182 | 182 | 182 | 192 | 203 |
| Properties, ceramicized | | | | | | | | | | | |
| Density | g/cm³ | 2.539 | 2.541 | 2.540 | 2.546 | 2.543 | 2.533 | 2.537 | 2.535 | 2.557 | 2.540 |
| Therm. expansion $α_{20/700}$ | $10^{−6}$/K | −0.09 | 0.05 | 0.05 | 0.06 | 0.04 | −0.25 | −0.1 | −0.06 | +0.27 | 0.03 |
| Transmission, standard light C, 2° 4-mm thickness | | | | | | | | | | | |
| 400 nm | % | 61.8 | 58.2 | 61.1 | 50.7 | 52.7 | 59.9 | 61.4 | 72.0 | 62.7 | 62.2 |
| 1600 nm | % | 88.2 | 88.0 | 87.4 | 86.8 | 87.5 | 87.6 | 88.0 | 89.0 | 87.2 | 86.3 |
| Light transmission Y | % | 85.4 | 84.8 | 84.7 | 82.5 | 83.8 | 84.5 | 84.2 | 89.0 | 84.0 | 82.9 |
| Yellowness Index | | 8.3 | 9.0 | 8.3 | 12.3 | 11.1 | 9.3 | 9.0 | 5.9 | 10.8 | 14.0 |
| L* | | 94.1 | 93.8 | 93.8 | 92.8 | 93.4 | 93.7 | 93.6 | 95.6 | 93.5 | 93.0 |
| a* | | −0.8 | −1.0 | −0.8 | −1.2 | −1.2 | −0.9 | −0.7 | −0.6 | −0.8 | −0.6 |

TABLE 2-continued

Properties of glass ceramics according to the invention and comparative glass ceramics (Ceramicizing program 1)

| | | Example No. | | | | | | | | | |
|---|---|---|---|---|---|---|---|---|---|---|---|
| | | 1 | 2 | 3 | 4 | 5 | 6 | 7 | 8 | 9 | 10 |
| b* | | 4.5 | 5.0 | 4.5 | 6.7 | 6.1 | 5.1 | 4.8 | 3.2 | 5.8 | 7.4 |
| c* | | 4.6 | 5.1 | 4.6 | 6.8 | 6.2 | 5.1 | 4.9 | 3.3 | 5.9 | 7.4 |
| Scattering Visual | | 1 | 1 | 1 | 1 | 1 | 2 | 1 | 2 | 7 | 10 |
| Compaction (700° C., 15 h, 100 mm rod/bar) | μm | 8 | 8 | 8 | 8 | 9 | 11 | 10 | 9 | 5 | 5 |
| X-ray diffraction Content of high-quartz mixed-crystal phase | % | 74 | 73 | 73 | 72 | 73 | 72 | 73 | 72 | 72 | 67 |
| Average crystal size | nm | 36 | 37 | 37 | 36 | 38 | 37 | 38 | 36 | 49 | 38 |

TABLE 3

Properties of glass ceramics according to the invention and comparative glass ceramics (Ceramicizing program 2)

| | | Example No. | | | | | | | | | |
|---|---|---|---|---|---|---|---|---|---|---|---|
| | | 11 | 12 | 113 | 14 | 15 | 16 | 17 | 18 | 19 | 20 |
| Glass No. | | 11 | 12 | 113 | 14 | 15 | 16 | 17 | 18 | 19 | 20 |
| Ceramicizing program | | 2 | 2 | 2 | 2 | 2 | 2 | 2 | 2 | 2 | 2 |
| Properties, ceramicized Transmission, standard, light C 2° 4-mm thickness | | | | | | | | | | | |
| 400 nm | % | 63.0 | 62.1 | 64.0 | 58.9 | 58.9 | 65.8 | 66.8 | 73.8 | 57.7 | 50.7 |
| 1600 nm | % | 87.9 | 88.9 | 87.2 | 87.7 | 87.7 | 87.9 | 87.9 | 89 | 87.4 | 83.7 |
| Light transmission Y | % | 84.2 | 85.4 | 84.1 | 84.2 | 84.0 | 85.1 | 84.5 | 89.2 | 83.7 | 75.3 |
| Yellowness Index | | 8.2 | 8.4 | 7.5 | 8.8 | 9.0 | 7.2 | 7.2 | 5.3 | 12.0 | 19.9 |
| L* | | 93.5 | 94.0 | 93.5 | 93.5 | 93.5 | 93.9 | 93.6 | 95.7 | 93.3 | 89.5 |
| a* | | -0.7 | -0.7 | -0.6 | -0.9 | -0.9 | -0.6 | -0.4 | -0.5 | -1.2 | -0.5 |
| b* | | 4.4 | 4.6 | 4.0 | 4.8 | 4.9 | 3.8 | 3.8 | 2.9 | 6.6 | 10.3 |
| c* | | 4.4 | 4.6 | 4.0 | 4.8 | 5.0 | 3.9 | 3.8 | 2.9 | 6.7 | 10.3 |
| Scattering Visual | | 1-2 | 1 | 2 | 1 | 1 | 1-2 | 1-2 | 2 | 5 | 8 |
| haze (4-mm thickness) | % | 0.6 | | 1.1 | 0.7 | 0.6 | 0.6 | | 1.2 | 2.3 | 5.6 |

What is claimed is:

1. A transparent $Li_2O$—$Al_2O_3$—$SiO_2$-(LAS) glass ceramic, comprising high-quartz mixed crystals as the main crystal phase, free of arsenic and antimony except for unavoidable raw-material impurities, and components (in wt. % based on oxide):

| $TiO_2$ | 1.6-<2.5, |
| $Nd_2O_3$ | 0.005-0.15, |
| MgO | 0.2-1.0, |
| ZnO | 1-2.5, |
| CaO + SrO | 0-1.5, and |
| BaO | 0-1.5, | wherein a condition B1 comprises MgO+ZnO>CaO+SrO+BaO, and
wherein a condition B2 comprises 1<(MgO+ZnO)/(CaO+SrO+BaO)<3.

2. The glass ceramic according to claim 1, wherein the condition B2 comprises 1.5<(MgO+ZnO)/(CaO+SrO+BaO)<3.

3. The glass ceramic according to claim 1, wherein the $TiO_2$ is present (in wt. % based on oxide) in an amount comprising 1.8-<2.5.

4. The glass ceramic according to claim 1, wherein the BaO is present (in wt. % based on oxide) in an amount comprising at least 0.1.

5. The glass ceramic according to claim 1, further comprising a sum of CaO+SrO that is (in wt. % based on oxide) 0.05-1.5.

6. The glass ceramic according to claim 1, wherein the SrO is present (in wt. % based on oxide) in an amount comprising 0.05-1.5.

7. The glass ceramic according to claim 1, wherein the CaO is present (in wt. % based on oxide) in an amount comprising 0.05-0.8.

8. The glass ceramic according to claim 1, further comprising a sum of CaO+SrO +BaO that is (in wt. % based on oxide) 0.2 to 2.

9. The glass ceramic according to claim 1, further comprising a sum of CaO+SrO +BaO that is (in wt. % based on oxide) 0.4 to 1.8.

10. The glass ceramic according to claim 1, further comprising a crystal phase content of the high-quartz mixed crystals of 60-85 wt. %.

11. The glass ceramic according to claim 1, further characterized by an average crystallite size of the high-quartz mixed crystals of less than 45 nm.

12. The glass ceramic according to claim 1, further comprising secondary crystal phases, which are mixed crystals of nucleating agents selected from the group consisting of $TiO_2$, $ZrO_2$, $SnO_2$, and combinations thereof.

13. The glass ceramic according to claim 12, further comprising a content of the secondary crystal phases that is <8%.

14. The glass ceramic according to claim 1, further comprising secondary crystal phases, which are crystals of keatite mixed-crystal type.

15. The glass ceramic according to claim 14, further comprising a content of the secondary crystal phases that is <8%.

16. The glass ceramic according to claim 1, further comprising $Li_2O$, $Al_2O_3$ and $SiO_3$ in the following amounts (in wt. % based on oxide):

| | |
|---|---|
| $Li_2O$ | 3.2-4.2, |
| $Al_2O_3$ | 19-23, and |
| $SiO_2$ | 64-68. |

17. The glass ceramic according to claim 1, further comprising the following components (in wt. % based on oxide): $Na_2O+K_2O$ 0.1-1.5.

18. The glass ceramic according to claim 1, further comprising $ZrO_2$ (in wt. % based on oxide) of 1.2-2.

19. The glass ceramic according to claim 1, further comprising $ZrO_2$ (in wt. % based on oxide) of 1.2 to <2.

20. The glass ceramic according to claim 1, further comprising $SnO_2$ (in wt. % based on oxide) of 0-0.50.

21. The glass ceramic according to claim 1, further comprising $SnO_2$ (in wt. % based on oxide) of 0.08-0.25.

22. The glass ceramic according to claim 1, further comprising $SnO_2$ (in wt. % based on oxide) of 0.05 to <0.25.

23. The glass ceramic according to claim 1, further comprising $SnO_2$ (in wt. % based on oxide) of >0.1-0.25.

24. The glass ceramic according to claim 1, further comprising $SnO_2$ (in wt. % based on oxide) of >0.05-0.2.

25. The glass ceramic according to claim 1, further comprising the following components (in wt. % based on oxide): $TiO_2+ZrO_2+SnO_2$ 3.5-5.

26. The glass ceramic according to claim 1, further comprising $Fe_2O_3$ (in wt. % based on oxide) of 0.01 to 0.03.

27. The glass ceramic according to claim 1, further comprising $Fe_2O_3$ (in wt. % based on oxide) of >0.01 to 0.03.

28. The glass ceramic according to claim 1, further comprising, as a refining agent, at least one component selected from the group consisting of: $SnO_2$, sulfate compounds, and halide compounds, where the refining agent being present in an amount (in wt. % based on oxide) up to 1.5.

29. The glass ceramic according to claim 1, wherein the components do not contain a halide compound as a refining agent.

30. The glass ceramic according to claim 1, wherein the components comprise (in wt. % based on oxide):

| | |
|---|---|
| $Li_2O$ | 3.2-4.2, |
| $Na_2O + K_2O$ | 0.1-1.5, |
| MgO | 0.2-1.0, |
| CaO + SrO | 0-1.5, |
| BaO | 0-1.5, |
| CaO + SrO + BaO | 0.2-2, |
| ZnO | 1-2.5, |
| $Al_2O_3$ | 19-23, |
| $SiO_2$ | 64-68, |
| $TiO_2$ | 1.6-<2.5, |
| $ZrO_2$ | 1.2-<2.0, |
| $SnO_2$ | 0-0.5, |
| $Nd_2O_3$ | 0.005-0.15, and |
| $Fe_2O_3$ | >0.01-0.03. |

31. The glass ceramic according to claim 1, wherein the components comprise (in wt. % based on oxide):

| | |
|---|---|
| $Li_2O$ | 3.2-<4.0, |
| $Na_2O + K_2O$ | 0.2-1.2, |
| MgO | 0.3-0.9, |
| CaO + SrO | 0.05-1.5, |
| BaO | 0-1.5, |
| CaO + SrO + BaO | 0.4-1.8, |
| ZnO | >1.5-2.2, |
| $B_2O_3$ | 0-1, |
| $Al_2O_3$ | 20-23, |
| $SiO_2$ | 65-68, |
| $TiO_2$ | 1.6-<2.5, |
| $ZrO_2$ | 1.5-<2.0, |
| $SnO_2$ | >0-0.5, |
| $TiO_2 + ZrO_2 + SnO_2$ | 3.5-5, |
| $P_2O_5$ | 0-2, |
| $Nd_2O_3$ | 0.005-0.1, and |
| $Fe_2O_3$ | >0.013-0.025. |

32. The glass ceramic according to claim 1, wherein the components comprise (in wt. % based on oxide):

| | |
|---|---|
| $Li_2O$ | 3.2-<4.0, |
| $Na_2O + K_2O$ | 0.2-1.2, |
| MgO | 0.3-0.9, |
| CaO + SrO | 0.05-1.5, |
| BaO | 0-1.5, |
| CaO + SrO + BaO | 0.4-1.8, |
| ZnO | >1.5-2.2, |
| $B_2O_3$ | 0-1, |
| $Al_2O_3$ | 20-23, |
| $SiO_2$ | 65-68, |
| $TiO_2$ | 1.6-<2.5, |
| $ZrO_2$ | 1.5-<2.0, |
| $SnO_2$ | >0-0.5, |
| $TiO_2 + ZrO_2 + SnO_2$ | 3.5-5, |
| $P_2O_5$ | 0-2, |
| $Nd_2O_3$ | 0.005-0.1, and |
| $Fe_2O_3$ | >0.011-0.025. |

33. The glass ceramic according to claim 1, wherein the components comprise (in wt. % based on oxide):

| | |
|---|---|
| $Li_2O$ | 3.4-3.9, |
| $Na_2O + K_2O$ | 0.2-1.0, |
| MgO | 0.4-0.9, |
| CaO + SrO | 0.1-1.2, |
| BaO | 0-1.3, |

-continued

| | |
|---|---|
| CaO + SrO + BaO | 0.6-1.6, |
| ZnO | >1.5-2.0, |
| $B_2O_3$ | 0-1, |
| $Al_2O_3$ | 20-23, |
| $SiO_2$ | 65-68, |
| $TiO_2$ | 1.8-<2.5, |
| $ZrO_2$ | 1.5-1.9, |
| $SnO_2$ | 0.08-0.25, |
| $TiO_2 + ZrO_2 + SnO_2$ | 3.6-4.8, |
| $P_2O_5$ | 0-1, |
| $Nd_2O_3$ | 0.01-0.1, and |
| $Fe_2O_3$ | >0.013-0.022. |

34. The glass ceramic according to claim 1, wherein the components comprise (in wt. % based on oxide):

| | |
|---|---|
| $Li_2O$ | 3.4-3.9, |
| $Na_2O + K_2O$ | 0.2-1.0, |
| MgO | 0.4-0.9, |
| CaO + SrO | 0.1-1.2, |
| BaO | 0-1.3, |
| CaO + SrO + BaO | 0.6-1.6, |
| ZnO | >1.5-2.0, |
| $B_2O_3$ | 0-1, |
| $Al_2O_3$ | 20-23, |
| $SiO_2$ | 65-68, |
| $TiO_2$ | 1.8-<2.5, |
| $ZrO_2$ | 1.5-1.9, |
| $SnO_2$ | 0.05-<0.25, |
| $TiO_2 + ZrO_2 + SnO_2$ | 3.6-4.8, |
| $P_2O_5$ | 0-1, |
| $Nd_2O_3$ | 0.01-0.1, and |
| $Fe_2O_3$ | >0.011-0.022. |

35. The glass ceramic according to claim 1, further comprising a hue c* of less than 5.5.

36. The glass ceramic according to claim 1, further comprising a light transmission Y of greater than 81% and lacking a visually disruptive scattering.

37. The glass ceramic according to claim 1, further comprising, after a rapid ceramicizing of less than 90 min, a light transmission Y that is greater than 82% and a hue c* that is less than 5 with visually inconspicuous scattering.

38. The glass ceramic according to claim 1, further comprising a property selected from the group consisting of a $10^2$ temperature of less than 1770° C., a processing temperature $V_A$ of 1325° C. at most, an upper devitrification limit (OEG), which lies at least 10° C. below the processing temperature $V_A$, and any combinations thereof.

39. The glass ceramic according to claim 1, further comprising fewer than 2 bubbles/kg.

40. The glass ceramic according to claim 1, further comprising a plate shape or a panel shape.

41. The glass ceramic according to claim 40, wherein the plate shape or a panel shape is suitable for a use selected from the group consisting of a fireplace viewing window, a fire-protection glass, a safety glass, a baking-oven viewing window, and a cooktop.

42. A transparent $Li_2O$—$Al_2O_3$—$SiO_2$-(LAS) glass ceramic, consisting essentially of high-quartz mixed crystals as the main crystal phase, free of arsenic and antimony except for unavoidable raw-material impurities, and components (in wt. % based on oxide):

| | |
|---|---|
| $Li_2O$ | 3.2-4.2, |
| $Al_2O_3$ | 19-23, |
| $SiO_2$ | 64-68, |
| $Na_2O + K_2O$ | 0.1-1.5 |
| $TiO_2$ | 1.6-<2.5, |
| $Nd_2O_3$ | 0.005-0.15, |
| MgO | 0.2-1.0, |
| ZnO | 1-2.5, |
| CaO + SrO | 0-1.5, |
| BaO | 0-1.5, |
| $ZrO_2$ | 1.2-2, |
| $SnO_2$ | 0-0.50, and |
| $Fe_2O_3$ | 0.01 to 0.03, | wherein a condition B1 comprises MgO+ZnO>CaO+SrO+BaO.

43. The ceramic according to claim 42, further comprising a condition B2 which comprises 1<(MgO+ZnO)/(CaO+SrO+BaO)<3.

* * * * *